US009843193B2

(12) United States Patent
Getsla

(10) Patent No.: US 9,843,193 B2
(45) Date of Patent: Dec. 12, 2017

(54) SAFETY SHUTDOWN SYSTEM FOR PHOTOVOLTAIC POWER GENERATORS

(71) Applicant: Robert Getsla, San Jose, CA (US)

(72) Inventor: Robert Getsla, San Jose, CA (US)

( * ) Notice: Subject to any disclaimer, the term of this patent is extended or adjusted under 35 U.S.C. 154(b) by 390 days.

(21) Appl. No.: 14/805,177

(22) Filed: Jul. 21, 2015

(65) Prior Publication Data

US 2016/0036235 A1     Feb. 4, 2016

Related U.S. Application Data

(60) Provisional application No. 62/030,868, filed on Jul. 30, 2014.

(51) Int. Cl.
    *H02J 3/38*            (2006.01)
    *H02S 50/00*        (2014.01)
    *H02J 7/35*           (2006.01)

(52) U.S. Cl.
    CPC ............... *H02J 3/383* (2013.01); *H02J 7/35* (2013.01); *H02S 50/00* (2013.01); *Y02B 10/14* (2013.01); *Y02E 10/563* (2013.01); *Y02E 10/566* (2013.01)

(58) Field of Classification Search
    CPC .................................................... H02J 3/383
    USPC ........................................................ 307/80
    See application file for complete search history.

(56) References Cited

U.S. PATENT DOCUMENTS

| | | | |
|---|---|---|---|
| 8,446,042 B2 | 5/2013 | Bundschuh et al. | |
| 8,742,620 B1 | 6/2014 | Brennan et al. | |
| 8,837,098 B2 | 9/2014 | Victor et al. | |
| 8,933,321 B2 | 1/2015 | Hadar et al. | |
| 2012/0138123 A1 | 6/2012 | Newdoll et al. | |
| 2012/0310427 A1 | 12/2012 | Williams et al. | |
| 2014/0183950 A1 | 7/2014 | Kohler | |
| 2014/0265586 A1 | 9/2014 | Willis | |
| 2014/0265638 A1* | 9/2014 | Orr | H01L 31/02021 307/131 |

OTHER PUBLICATIONS

Zind, T., "Solar Under Fire," Electrical Construction and Maintenance, Mar. 19, 2014.

* cited by examiner

*Primary Examiner* — Joseph Chang
(74) *Attorney, Agent, or Firm* — William E. Winters; Patent Law Professionals, P.C.

(57) ABSTRACT

A photovoltaic power generator with safety shutdown system includes a plurality of solar panel strings, a combiner, and a plurality of solar safety switches electrically disposed between a plurality of DC outputs of the plurality of solar panels strings and a plurality of DC inputs of the combiner. Each solar safety switch is associated with one of the solar panel strings and includes a solid-state device and a close actuator. The solid-state device of each solar safety switch is connected between the positive and negative terminals of the DC output of its associated solar panel string. The close actuator in each solar safety switch controls whether its associated solid-state device is turned on or is turned off. During normal operating conditions, the close actuators prevent their respective solid-state devices from turning on. However, in the event of a fire, the close actuators cause their associated solid-state devices to turn on, thereby effectively short-circuiting the DC outputs of their associated solar panel strings and preventing the solar panel strings from producing high voltages.

28 Claims, 7 Drawing Sheets

SAFETY SHUTDOWN SYSTEM FOR PHOTOVOLTAIC POWER GENERATORS

CROSS-REFERENCE TO RELATED APPLICATIONS

This application claims the benefit of U.S. Provisional Patent Application No. 62/030,868, filed on Jul. 30, 2014.

FIELD OF THE INVENTION

The present invention relates in general to photovoltaic (PV) power generators, and in particular to safety shutdown systems, methods, and apparatuses employed in PV power generators.

BACKGROUND OF THE INVENTION

Photovoltaic (PV) power generators employ solar panels to convert solar radiation from the Sun into electrical power for residences, commercial and industrial buildings, remotely located telecommunications relay systems, and a wide variety of other applications. To maximize exposure to the Sun and increase collection efficiency, the solar panels are usually installed on the rooftop of a house or building to which the electrical power is being supplied.

One significant safety-related problem with PV power generators is that the solar panels generate high voltages. These high voltages pose a hazard to anyone who might come into contact with the panels. Because solar panels produce high voltages simply by being exposed to the Sun, the high-voltage hazard remains, even if the solar panels are disconnected from other parts of the PV power generator.

Firefighters, in particular, are very well aware of the high-voltage hazard presented by roof-mounted solar panels. To more effectively battle a fire and increase the ability to locate and rescue individuals who may be trapped in a burning building, firefighters will often seek to ventilate the burning building by cutting a hole through its roof (e.g., by using a chainsaw). Ventilating allows heat and smoke inside the building to be expelled, making it easier for firefighters to extinguish the fire and safer to attempt a rescue. Unfortunately, knowing that solar panels pose a high-voltage hazard, firefighters are reluctant to, and in some cases may even refuse to, access the roof of a burning building if solar panels are present. The invention described below addresses this and other related problems.

BRIEF SUMMARY OF THE INVENTION

A photovoltaic (PV) power generator with safety shutdown system includes a plurality of solar panel strings, a combiner, and a plurality of solar safety switches electrically disposed between a plurality of DC outputs of the plurality of solar panels strings and a plurality of DC inputs of the combiner. Each solar safety switch of the plurality of solar safety switches is associated with one of the solar panel strings of the plurality of solar panel strings. In one particular embodiment of the invention, each solar safety switch includes a thyristor and a close actuator that controls whether the thyristor is turned on or is turned off. The thyristor of each solar safety switch is connected between the positive and negative terminals of the DC output of its associated solar panel string. In one particular embodiment of the invention, each close actuator includes a programmable unijunction transistor (PUT) and an inhibitor circuit. During times when the photovoltaic power generator is operating under normal operating conditions, the inhibitor circuits of the close actuators inhibit the PUTs from triggering on the thyristors, i.e., maintain the thyristors in all of the safety switches off. Upon the occurrence of a fire in the vicinity of the photovoltaic power generator, however, the inhibitor circuits in the close actuators of the solar safety switches are all disabled and the PUTs in all solar safety switches operate to trigger on their respective thyristors. Triggering on the thyristors results in the thyristors effectively short-circuiting the DC outputs of their associated solar panel strings, thereby preventing the solar panel strings from producing high voltages at their outputs. Preventing high-voltages from being produced at the outputs of the solar panel strings thus allows firefighters to access the rooftop of the building upon which the solar panel strings are installed, for example, in order to ventilate the building without the risk of being exposed to high voltages.

By virtue of the simple design, already-installed PV power generators can be readily retrofitted to include the solar safety switches 106 and thereby allow the resulting retrofitted PV power generators to perform the PV safety shutdown systems and methods of the present invention. The solar safety switches 106 can also be easily incorporated into new PV power generator installations, and because of their versatility can be employed in PV power generators of all kinds, including, both grid-tied PV power generators and stand-alone PV power generators having no connection to a utility grid.

Further features and advantages of the invention, including a detailed description of the above-summarized and other exemplary embodiments of the invention, will now be described in detail with respect to the accompanying drawings, in which like reference numbers are used to indicate identical or functionally similar elements.

DETAILED DESCRIPTION

Figure 1:
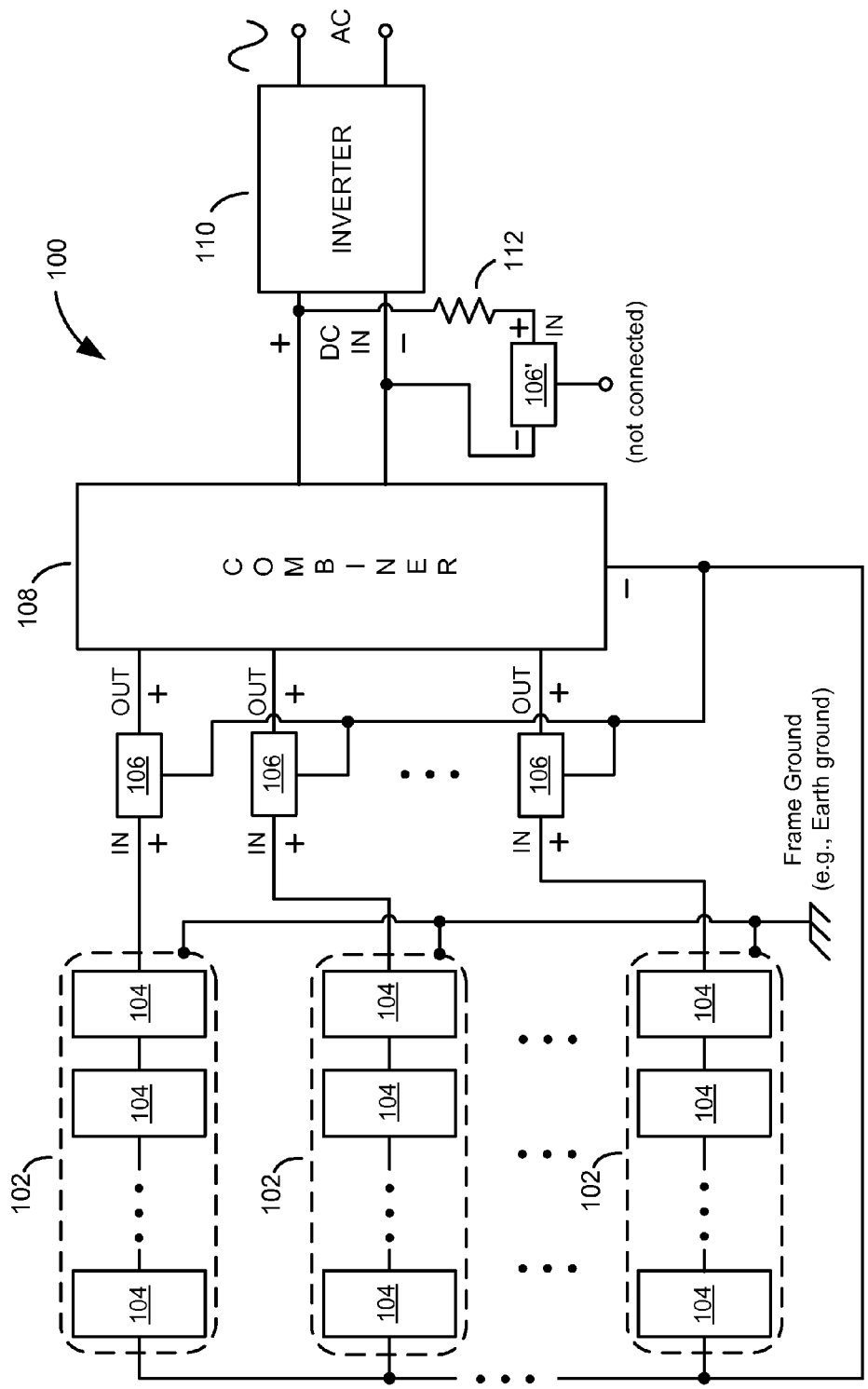
FIG. 1 is a drawing of a portion of a photovoltaic (PV) power generator, illustrating how the solar safety switches of the present invention are deployed, in accordance with one embodiment of the invention.

FIG. 1 is a drawing of a PV power generator with safety shutdown system 100, according to an embodiment of the present invention. The PV power generator with safety shutdown system 100 comprises one or more series-connected solar panel strings 102, one or more solar safety switches 106 associated with the one or more solar panel strings 102; a combiner 108; and an inverter 110. The solar panels strings 102 form an array of solar panels 104 that is typically mounted on a rooftop of a residence or building to convert solar energy from the Sun into direct current (DC) power. The combiner 108 combines the DC voltages produced at the outputs of the solar panel strings 102 to produce a single, combined DC voltage ("labeled "DC IN" in the drawing), which is applied to the input of the inverter 110. The inverter 100 serves to convert the combined DC power produced by the array of solar panel strings 102 into AC power, which is distributed to AC loads (e.g., 110 VAC fixtures, appliances, etc.) in the home or building. It should be noted that the PV power generator of the PV power generator with safety shutdown system 100 depicted in FIG. 1 is not necessarily representative of a complete PV power generator. For example, the PV power generator would typically further include a battery bank containing one or more batteries and a charge controller to regulate the charging of the batteries in the battery bank, and could also, though not necessarily, be connected to a utility grid, as will be appreciated and understood by those of ordinary skill in the art.

As shown in FIG. 1, each of the solar safety switches 106 in the PV power generator with safety shutdown system 100 is disposed between an associated solar panel string 102 and the combiner 108. As will be explained in further detail below, each solar safety switch 106 is configured to short-circuit the DC output of its respective solar panel string 102 when a fire hazard is present. Short-circuiting the outputs of the solar panel strings 102 prevents high voltages from being produced at the DC outputs of the solar panel strings 102. Short-circuiting the DC outputs of each solar panel string allows firefighters to access the rooftop of the building or residence upon which the array of solar panel strings 102 is mounted, thereby allowing firefighters to access the rooftop to battle the fire, for example, to ventilate the building or residence without the risk of being exposed to high voltages that would otherwise be produced at the outputs of the solar panel strings 102. It should be mentioned that, whereas the exemplary safety shutdown systems and methods described herein are shown and described as safeguarding against high-voltage hazards generated by solar panel strings 102 containing a plurality of solar panels 104 that are connected in series, they can alternatively be deployed to provide high-voltage protection to any group of solar panels 104, whether the group of solar panels 104 is connected in series, parallel, series-parallel or any other electrical configuration. Furthermore, the solar safety switches 106 can be alternatively employed to provide high-voltage protection at the individual solar panel level, i.e., with a solar safety switch 106 configured to safeguard against high voltages produced by a single individual solar panel 104.

Figure 2:
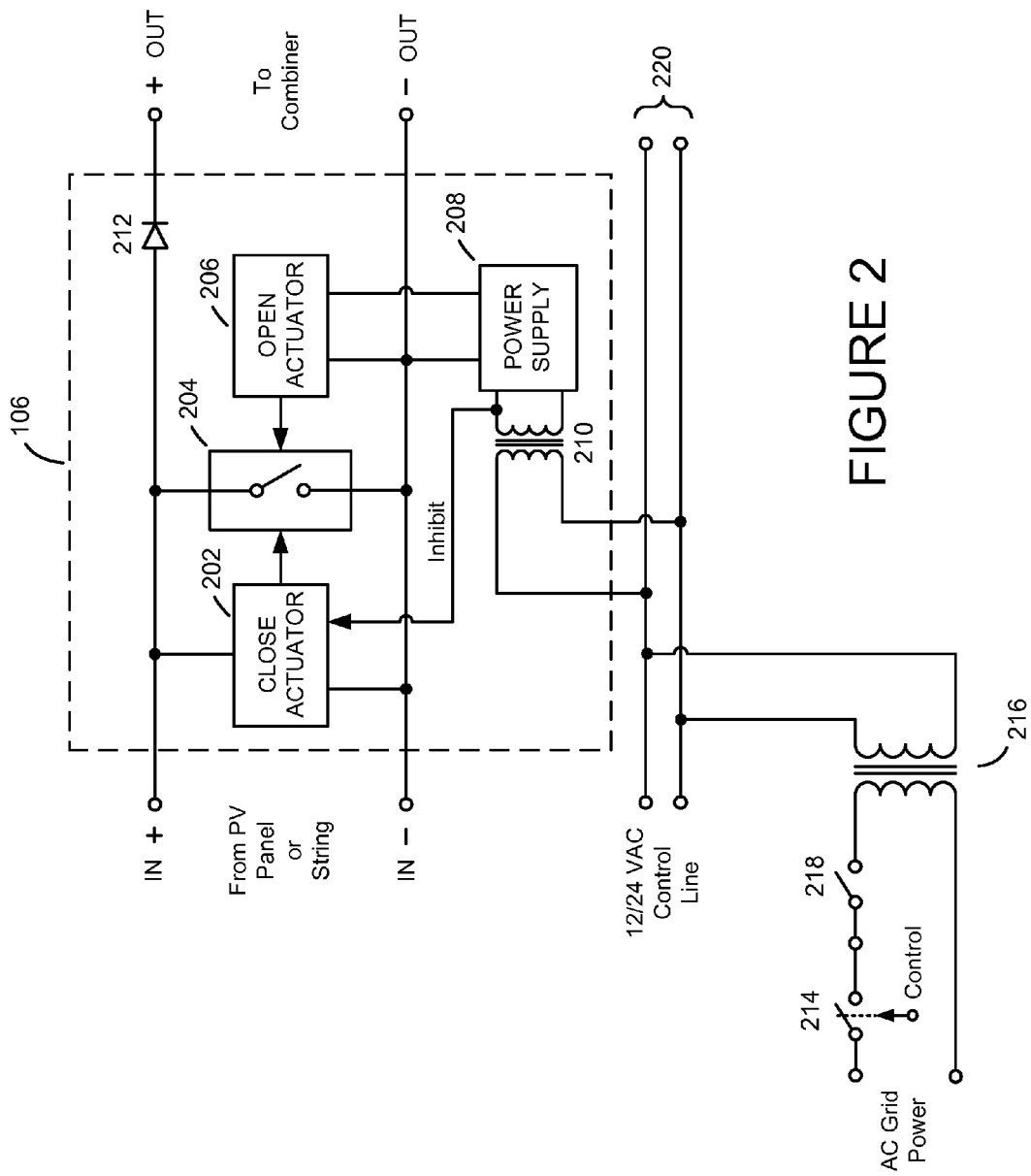
FIG. 2 is a drawing illustrating one way in which each of the solar safety switches of the system in FIG. 1 may be designed, in accordance with one embodiment of the invention.

FIG. 2 is a drawing showing the salient components of one of the solar safety switches 106, in accordance with one embodiment of the invention. Each solar safety switch 106 comprises a close actuator 202, a high-current switch 204, an open actuator 206, a power supply 208, a DC isolation transformer 210, and an isolation diode 212. The high-current switch 204 is a type of switch that is capable of passing and withstanding, when closed, the full short circuit current produced by its associated solar panel string 102, and that is capable of withstanding the full open circuit voltage of its associated solar panel string 102 without spontaneously breaking down. In one embodiment of the invention, the high-current switch 204 comprises a thyristor (e.g., a silicon controlled rectifier (SCR)). The solar safety switches 106 have a simple and efficient design, which allows them to be individually packaged in a housing (e.g., an electrical containment box) that is no larger than about the size of a deck of playing cards. The small form factor further allows the solar safety switches 106 to be easily mounted underneath the solar panels 104, for example, to frames or brackets that contain or secure the solar panels 104, or to some other securing means located beneath the solar panels 104. The ability to secure or mount the solar safety switches 106 beneath the solar panels 104 is beneficial since it allows the solar panels 104 to serve as weather shields that protect the solar safety switches 106 from the elements (e.g., rain, sun, snow, etc.). Each solar safety switch 106 could also be manufactured as an integrated component of the solar panel 104 itself, as a permanent or semi-permanent attachment to the solar panel 106 or solar panel framing, or as a permanent or semi-permanent module disposed or integrated in the wiring or cabling associated with the solar panel 104 or solar panel string 102.

During normal operating conditions, when no fire is present, a pulsating inhibit signal is continuously produced and applied to the input of the close actuator 202 (see FIG. 2), causing the close actuator 202 to maintain it associated thyristor 204 in an off (i.e., open) state. The close actuators 202 in the other solar safety switches 106 associated with the other solar panel strings 102 operate in the same manner. The pulsating inhibit signal in each solar safety switch 106 is produced based on an AC voltage this is induced across the secondary winding of the DC isolation transformer 210 from an AC voltage that is produced across the secondary winding of a control line transformer 216 and applied to a low-voltage (e.g., 12 or 24 VAC) AC control line 220. The control line transformer 216 can be a newly installed transformer or may be a transformer that is already installed in the building on which the array of solar panel strings 102 of the PV power generator with safety shutdown system 100 is installed. In many homes and buildings, a 120 VAC/12 VAC or 120 VAC/24 VAC transformer is already present. Such transformers are commonly used to control thermostats, door bells, air conditioning units, door entry controls, alarm systems, etc. Leveraging any one of those already-installed control line transformer can therefore reduce labor, material, and installation costs, and can simplify retrofitting already-installed PV power generators to include the PV safety shutdown system and method of the present invention, as well as simplify the installation of new PV power generator installations. In fact, the task of wiring the control lines 506 to the solar safety switches 106 can be as simple as the task of wiring up a thermostat. In the exemplary embodiments of the invention descried herein it is assumed that that the control line voltage is 12 VAC or 24 VAC, thereby allowing any already-installed control line transformer 216 to be used. However, it is possible for the control line voltage can be some other AC voltage other than 12 VAC or 24 VAC. Because electrical codes and regulations often require some form of conduit or extra insulation above 30 volts, in order to reduce or prevent electrical hazards, it is nevertheless preferable to use a control line voltage below 30 VAC.

Referring back to FIG. 2, the pulsating inhibit signal in each solar safety switch 106 continues to be produced for each solar safety switch 106, so long as an AC voltage is maintained across the primary winding of a control line transformer 216 (typically, the AC voltage is supplied from a utility grid, as explained in further detail below). During normal operating conditions, when no fire hazard is present, the DC voltage generated at the DC output of each solar panel string 102 is directed to the combiner 108. The combined DC voltage produced by the combiner 108 (labeled "DC IN") is then converted by the inverter 110 to an AC voltage (e.g. 110 VAC @ 60 Hz in the United States) for use in powering AC loads in the residence or building to which the system 100 is configured to supply AC power.

As will be explained in further detail below, in the event of a fire, an automatically-triggered grid-disconnect switch (or relay) 214 (see FIG. 2) is opened, or a manually-operated switch 218 is opened, so that no AC voltage is applied across the primary winding of the control line transformer 216. In the absence of any AC voltage applied across the primary winding of the control line transformer 216, no AC voltage is induced across the secondary winding of the control line transformer 216. Consequently, no inhibit signal is induced across the secondary of the DC isolation transformer 210. With no pulsating inhibit signals being produced in the solar safety switches 106, the close actuators 202 in the solar safety switches 106 are unable to inhibit their thyristors 204 from turning on. The thyristors 204 in all solar safety switches 106 therefor all turn on, causing the solar panel strings 102 to all be short-circuited through their respective thyristors 204. Closing the solar safety switches 106 and short-circuiting the solar panel strings 102 thus prevents high voltages from developing across the outputs of the solar panel strings 102 (see FIG. 1), allowing firefighters to safely access the rooftop on which the array of solar panel strings 102 is installed, for example to perform ventilation procedures, without being exposed to high voltage hazards.

Figure 3:
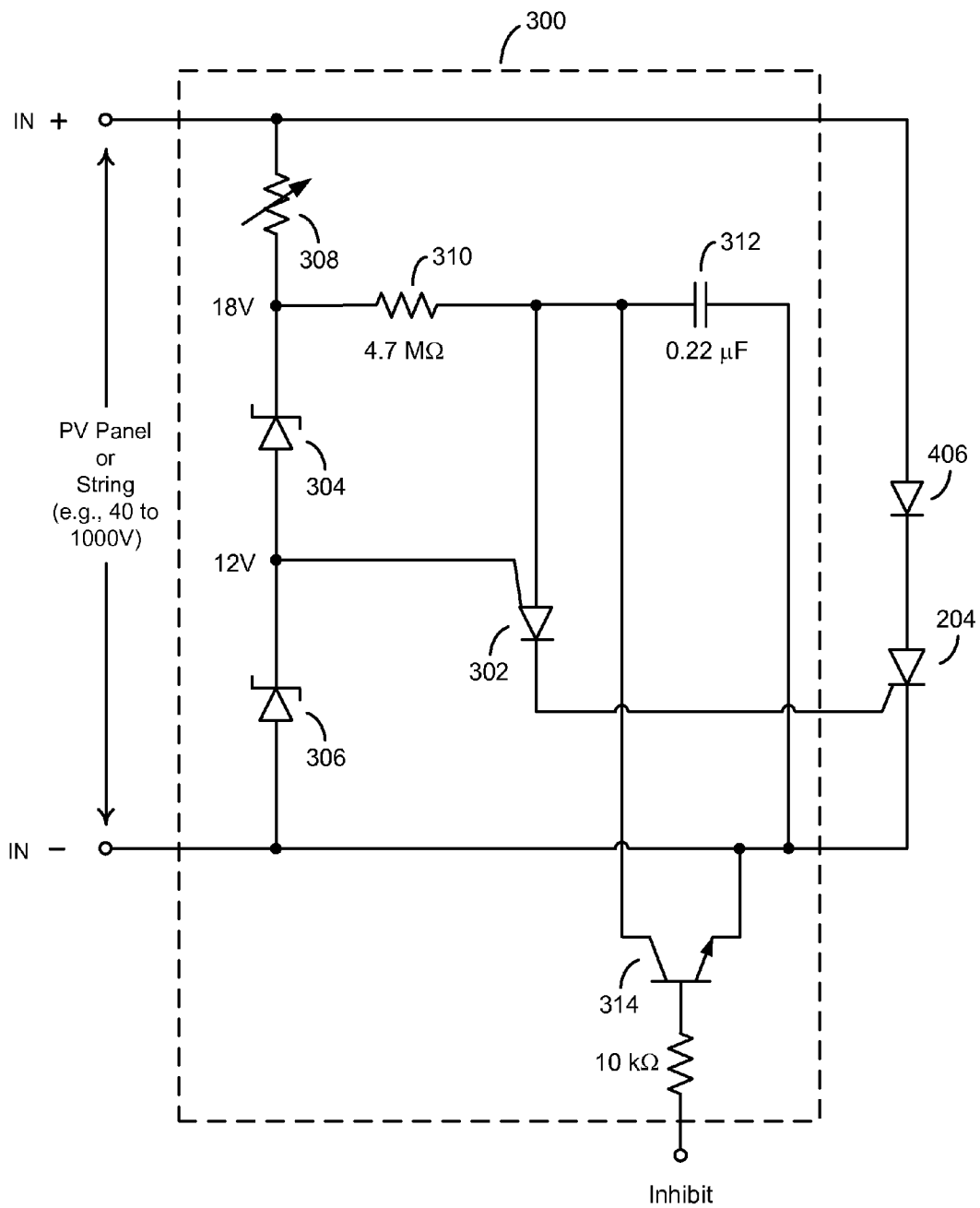
FIG. 3 is a schematic drawing of close actuator circuit, which may be used to implement the close actuator in the exemplary solar safety switch depicted in FIG. 2.
Figure 4:
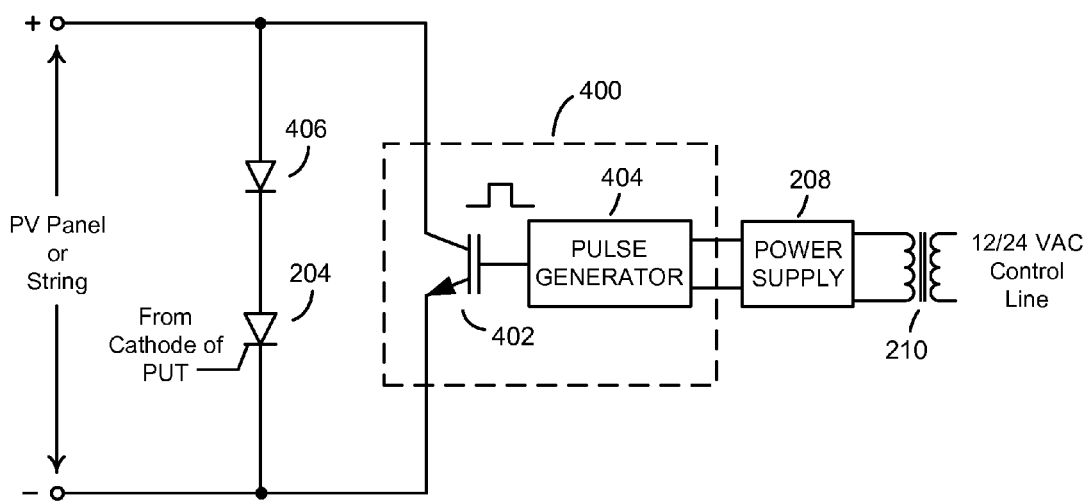
FIG. 4 is a schematic drawing of an open actuator circuit, which may be used to implement the open actuator in the exemplary solar safety switch depicted in FIG. 2.

FIG. 3 is a schematic drawing of an exemplary close actuator circuit 300, which may be used to implement the close actuator 202 of the exemplary solar safety switch 106 depicted in FIG. 2. Exemplary component values for the various components of the close actuator circuit 300 and exemplary voltages produced in the close actuator 300 are shown in the schematic drawing. The exemplary component values and voltages are merely exemplary and should not be viewed as restricting the scope of the claimed invention in any way. As shown in FIG. 4, the close actuator circuit 300 comprises a programmable unijunction transistor (PUT) 302 (similar to a thyristor but with an anode control gate); first and second Zener regulator diodes 304 and 306; a current-limiting resistor 308; a timing resistor 310; a timing capacitor 312; and a discharge transistor 314. The first and second Zener diodes 304 and 306 are configured to establish a threshold voltage (12 volts in the exemplary design depicted in the drawing) at the gate of the PUT 302, as well as establish a constant bias voltage (18 volts in the exemplary design depicted in the drawing) at the node that intersects the current-limiting and timing resistors 308 and 310. The current-limiting resistor 308 serves to limit the current that can flow through the first and second Zener diodes 304 and 306 and has a value that is determined and set depending on the voltage produced by the associated solar panel string 102. It is therefore indicated as being a variable resistor in the drawing. The discharge transistor 314 is configured to repeatedly discharge the timing capacitor 312, in response to each successive pulse in the pulsating inhibit signal provided at the secondary winding of the DC isolation transformer 210. The timing resistor and capacitor 310 and 312 are sized together to produce an RC time constant that is longer than the period of the pulsating inhibit signal, so that under normal operating conditions the timing capacitor 312 does not produce a voltage higher than the threshold voltage applied to the gate of the PUT 302. In one embodiment of the invention applicable in the United States, the frequency of the AC voltage applied across the primary winding of the control line transformer 216 is 60 Hz. Since the pulsating inhibit signal is induced from the 12/24 VAC control line voltage, the period of the inhibit signal is of the same duration as the period of the AC line voltage ($\frac{1}{60}$ Hz in the United States). Accordingly, for PV power generators used in the United States, the timing resistor and capacitor 310 and 312 are set so that the RC time constant they provide has a value longer than $\frac{1}{60}$ seconds. To account for power glitches and the possibility that the power utility may suspend power delivery for a limited number of power cycles (which the utility can do, at times), the RC time constant can be made longer, for example, on the order of a half second to a second. By increasing the RC time constant, undesired false triggering of the PUT 302 is avoided.

When the pulsating inhibit signal in the solar safety switch 106 becomes absent (e.g., due to a fire hazard and the grid-disconnect switch or relay 214 or manually-operated switch 218 being opened), the discharge transistor 314 is turned off and is no longer capable of discharging the timing capacitor 312. Consequently, the timing capacitor 312 is able to charge up to a voltage that exceeds the threshold voltage set at the gate of the PUT 302, and the PUT 302 turns on. Current from the PUT 302 output is then directed to the gate of the thyristor 204, causing the thyristor 204 to also turn on and short circuit its associated solar panel string 102. The same result happens for all other solar panel strings 102 in the system 100 when a fire is present. Beneficially, the power used to short-circuit the solar panel strings 102 derives from the solar panels themselves and no other external power source is needed to complete the PV safety shutdown process.

The inverter 110 in the system 100 (see FIG. 1) will typically include an input capacitor (or an input capacitor bank), which under normal operating procedures will store a significant amount of charge. The stored charge results in a voltage developing across the input capacitor's terminals. The voltage can be very high (e.g., hundreds of volts), depending on the number of solar panels 104 in the solar panel strings 102 and the combined DC voltage DC IN produced by the combiner 108 and applied to the input of the inverter 110. In the absence of any high-voltage protection or capacitor discharging apparatus built within the inverter 110, the high voltage can remain present, even after the safety shutdown process described above has completed. Because the input capacitor or input capacitor bank in the inverter 110 is connected to the output of the combiner 108, in the absence of any high-voltage protection or capacitor discharging apparatus built within the inverter box, the high voltage produced across the inverter input capacitor or capacitor bank can pose a hazard to anyone who might come into contact with the DC wiring of the system 100 (for example, the DC wiring between the input of the inverter 110 and the output of the combiner 108 or the DC wiring between the outputs of the solar safety switches 106 and the combiner 108). If the isolation diodes 212 in the solar panel string safety switches 106 were not present, the inverter input capacitor could possibly be discharged through the thyristors 204 of the solar safety switches 106, via the combiner 108, during or after the PV safety shutdown process, thereby removing the high-voltage hazard. However, the presence of the isolation diodes 212 is desirable since they prevent the combiner 108 from being short circuited and/or combiner fuses from blowing while the safety shutdown process is being performed. To address this additional high-voltage hazard presented by the charged inverter input capacitor or capacitor bank, and without requiring removal of the isolation diodes 212, in one embodiment of the invention an additional solar safety switch 106' is connected across the DC input terminals of the inverter 110, as illustrated in FIG. 1. The additional (i.e. inverter-connected) solar safety switch 106' is similar to the solar safety switches 106 used to short circuit the solar panel strings 102 during the safety shutdown process. In fact, the inverter-connected solar safety switch 106' can be made to be essentially identical to the solar safety switches 106, except that it need not include an isolation diode 212. Although shown as being external to both the combiner 108 and the inverter 110, the inverter-connected solar safety switch 106' can be included as part of the design of the combiner 108 (for example, connected across the output terminals of the combiner 108 and contained within the housing of the combiner 108), or can be included as part of the design of the inverter 110 (for example, connected across the in DC input terminals of the inverter 110 and contained within the housing of the inverter 110). During the safety shutdown process, the thyristor 204 in the inverter-connected solar safety switch 106' turns on, just as the thyristors 204 in the solar safety switches 106 associated with the solar panel strings 102 turn on, allowing the charged inverter input capacitor or capacitor bank to discharge and the high-voltage hazard that it could otherwise present to be removed. Note that a high-wattage resistor 112 is preferably connected in series with the inverter-connected solar safety switch 106', in order to limit current flow through the solar safety switch 106' as the inverter input capacitor discharges.

The risk of being exposed to high voltages from the solar panels strings 102 only exists during daylight hours, when the solar panels 104 are being energized by the Sun. Consequently, short-circuiting the solar panels strings 102 is only necessary during the day. However, following an event that has caused the thyristors 204 to trigger on, and once the Sun sets for the evening, the currents flowing through the shorted solar panel strings 102 will eventually drop below the holding currents of their respective thyristors 204, and the thyristors 204 will turn off. Fortunately, if the hazard which originally caused the thyristors 204 to trigger on is still present the following morning, as the Sun rises and the solar panels 104 begin to become energized, the thyristors 204 in the solar safety switches 106 will retrigger to short circuit their respective solar power strings 102 and prevent high voltages from developing across the DC outputs of the solar panel strings 102. If the hazard is no longer present, possibly having been remedied overnight, and the system has been reconnected to the grid (automatically-triggered grid-disconnect switch or relay 214 and manually-operated grid-disconnect switch 218 in FIG. 2 both closed), the thyristors 204 will remain off and the system 100 will resume operation according to its normal operating procedures.

The open actuator 206 of the solar safety switch 106 (see FIG. 2) serves to reopen the thyristors 204 in the solar safety switches 106 after a high-voltage hazard which required the thyristors 204 to be turned off is no longer present. FIG. 4 is a schematic drawing of an exemplary open actuator 400 which may be used to implement the open actuator 206 of each of the solar safety switches 106. The open actuator 400 comprises an insulated gate bipolar transistor (IGBT) 402 and a pulse generator 404. When a high-voltage hazard is no longer present (automatically-triggered grid-disconnect switch or relay 214 and manually-operated grid-disconnect switch 218 in FIG. 2 both closed), the pulse generator 404 in each of the open actuators 400 of each of the solar safety switches 106 generates a single pulse having a magnitude and duration sufficient to temporarily turn its associated IGBT 402 on. The magnitude of the single pulse is determined by the DC power supply 208, which in one embodiment of the invention provides a supply voltage of between about 8 to 12 volts. The pulse generators 404 may be implemented using any suitable type of pulse generator. For example, a "power on reset" or "wake up" type pulse generator similar to that found in microwave ovens and other electronically-controlled appliances may be used. When the IGBT 402 is turned on, most of the panel string current is diverted through the IGBT 402, rather than continuing to flow through the thyristor 204. Only a minimal current less than the holding current of the thyristor 204 is allowed to flow through the thyristor 204. (To fully ensure that the current flowing through the thyristor 204 is less than the holding current, one or more diodes 406 may be configured in series with the thyristor 204.) Once the thyristors 204 of all solar safety switches 106 have been turned off and the output pulses of all the associated pulse generators 404 have ended, the PV power generator 100 resumes operation according to its normal operating procedures.

Figure 5:
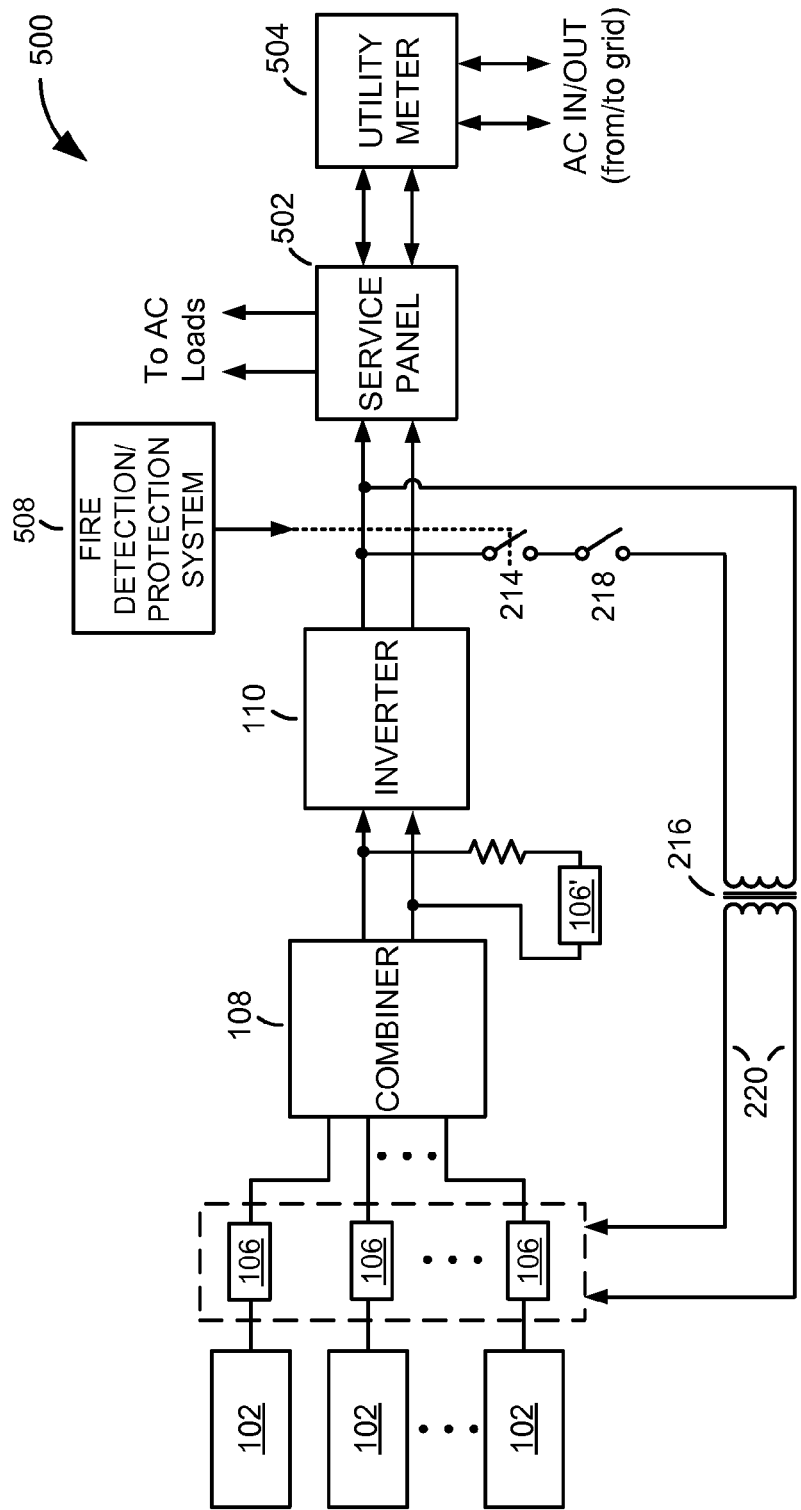
FIG. 5 is a drawing illustrating how the PV safety shutdown systems and methods of the present invention can be employed in a grid-tied PV power generator that does not have any local battery storage.

The solar safety switches 106 and the safety shutdown systems and methods described herein can be easily retrofitted into already-installed PV power generators and can also be easily incorporated in new PV power generator installations. They can also be employed in any type of PV power generator, including, for example, grid-tied PV power generators without local battery storage, grid-tied PV power generators with local battery storage, and stand-alone PV power generators (i.e., PV power generators that have no connection to a utility grid). FIG. 5 is a drawing illustrating how the safety shutdown systems and methods of the present invention can be employed in a grid-tied PV power generator 500 that does not have any local battery storage. The PV power generator 500 is similar to the PV power generator 100 shown and described in FIG. 1 above, but further shows how the AC output of the inverter 110 is coupled to a service panel 502 (e.g., main circuit breaker panel of a home or business) and utility meter 504, and how the control line transformer 216 is configured between the AC output of the inverter 110 and the AC control inputs (primary windings of the DC isolation transformers 210) of the solar safety switches 106. During normal operation, when the PV power generator 500 is converting solar energy into electrical energy, AC grid power from the service panel 502 is directed to the primary winding of the control line transformer 216. The control line transformer 216 then steps down the AC grid power (110 VAC in the United States) to a lower AC control line voltage (for example, 12 VAC or 24 VAC, as discussed above). The stepped-down AC control line voltage is directed along the low-voltage AC control line 220 to the AC control inputs of the solar safety switches 106, each of which produces a pulsating inhibit signal that prevents their respective close actuators 202 from triggering on their respective thyristors 204, as explained in detail above. When a fire hazard becomes present, the grid-disconnect switch or relay 214 is opened, resulting in no AC voltage being applied across the primary winding of the control line transformer 216 and, consequently, no AC voltage being present across the secondary winding of the control line transformer 216 (i.e., no AC voltage being produced on the low-voltage AC control line 220). Consequently, no pulsating inhibit signals can be generated by the solar safety switches 106. With no pulsating inhibit signals being generated, the close actuators 202 in the solar safety switches 106 are unable to inhibit their thyristors 204 from triggering on. Therefore, once the grid-disconnect switch or relay 214 is opened, the thyristors 204 in the solar safety switches 106 short-circuit their respective solar panel strings 102 to prevent high voltages from developing at the outputs of the solar panel strings, and firefighters can then safely access the rooftop of the residence or building upon which the array of solar panel strings 102 is installed, for example to ventilate the residence or building, without the risk of being exposed to high voltages.

In environments that have a central fire detection/protection system 508 in place, such as illustrated in FIG. 5, an electrical signal from the fire detection/protection system 508 can be used to automatically open the grid-disconnect switch or relay 214, and thereby automatically activate the PV safety shutdown process. The grid-disconnect switch 214 could also or alternatively be equipped with a radio receiver designed to receive and respond to a radio signal (e.g., a cellular signal) or a photo-transistor or photo-diode that is responsive to a light signal. Use of a radio receiver would allow firefighters, the residence or building owner, a home-monitoring service, electrical utility company, governmental authority, such as a police department, etc. to activate the PV safety shutdown method of the present invention from a remote location using a radio transmitter (e.g., a cellular telephone). Modern fire engines often include a pulsating light transmitter that can be used to control and switch traffic lights, in order to safely and more quickly drive to the site of a fire. This same pulsating light transmitter could be used to activate the grid-disconnect switch 214, if the grid-disconnect switch 214 is equipped with and designed to respond to the pulsating light transmitter.

It should be emphasized that even if a central fire detection/protection system 508 is unavailable to automatically open the grid-disconnect switch or relay 214, the PV safety shutdown method of the present invention can still be activated by simply opening the main breaker switch in the service panel 502. Inverters designed for PV power generators are designed to sense a loss of grid power and to stop supplying AC power to the grid when a power outage occurs. This built-in safety feature is required by law, in order protect electrical line workers from high voltages that could otherwise be back-fed into the local power lines and harm the line workers. In one embodiment of the present invention, this built-in safety feature is exploited in activating the PV safety shutdown process. Specifically, when the inverter 110 detects the absence of AC grid power after the main circuit breaker in the service panel 502 has been switched open, no AC voltage, whether from the output of the inverter 110 or from the grid is applied across the primary winding of the control line transformer 216 and, consequently, no AC voltage is induced across the secondary winding of the control line transformer 216. Accordingly, by simply opening the main circuit breaker switch in the service panel 502, the PV safety shutdown system described above can be activated and performed.

It should be mentioned that even in environments in which a central fire detection/protection system is available to automatically trigger (i.e., open) the grid-disconnect switch or relay 214, and even though the safety shutdown process can be activated by opening the main breaker switch in the service panel 502, local codes or regulations may require a separate, dedicated manually-operated switch to be installed and available to activate the PV safety shutdown method. If such a requirement exists, or is required or desired for any other reason, a separate dedicated manually-operated grid-disconnect switch 218 (see FIG. 5) can be included to activate the PV safety shutdown method. Like the automatically triggered grid-disconnect switch or relay 214, the manually-operated grid-disconnect switch 218 can be inserted either in series with the primary winding of the control line transformer 216 or in series with the secondary winding of the control line transformer 216. The manually-operated grid-disconnect switch 218 would preferably be housed in a Fire Department lock-box with an accompanying fire sign that can be easily seen by firefighters. Using a special key, firefighters could then open the lock-box when a fire hazard is present, manually manipulate the manually-operated grid-disconnect switch 218 to open it, and therefore quickly activate the PV safety shutdown method of the present invention described above.

Figure 6:
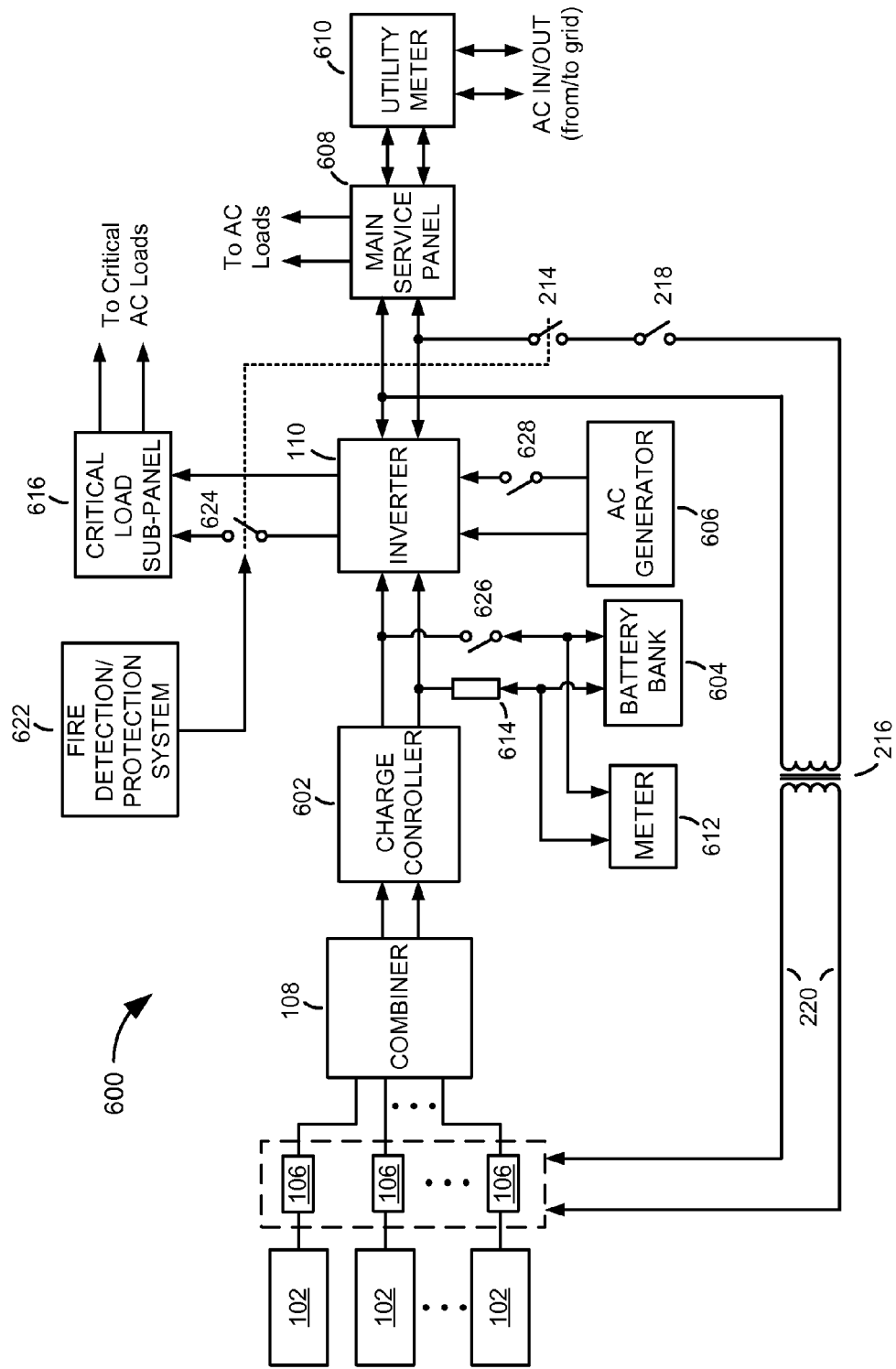
FIG. 6 is a drawing illustrating how the safety shutdown systems and methods of the present invention can be employed in a grid-tied PV power generator that has local battery storage.

FIG. 6 is a drawing illustrating how the safety shutdown systems and methods of the present invention can be employed in a grid-tied PV power generator 600 that does have local battery storage. In addition to the solar panel strings 102, solar safety switches 106, combiner 108, and inverter 110, the grid-tied PV power generator 600 includes a charge controller 602, a battery bank 604, and an optional AC power generator 606, such as a diesel generator, propane generator, gas turbine generator, etc. During normal operations, when energy from the Sun is being captured by the array of solar panel strings 102, the solar-produced DC power at the output of the charge controller 602 is converted to AC power by the inverter 110 and fed to the main service panel 608 of the residence or building on which the array of solar panel strings 102 is installed. The main service panel 608 then distributes the solar-produced AC power to AC loads in the residence or building. A utility meter 610 is used to monitor the solar-produced AC power in real-time. DC power generated by the array of solar panel strings 102 is also used to charge the battery bank 604, as regulated by the charge controller 602. The DC charging current provided by the charge controller 602 is monitored by a battery meter 612, as detected by a low-resistance shunt (small valued resistor 614). Any surplus solar-produced power not required to maintain the charge of the battery bank 604 and to power the AC loads in the residence or building is directed to the utility grid. In some jurisdictions, this surplus solar-produced AC power may be sold to the local utility. During times when AC power production by the grid-tied PV power generator 600 is low (for example, during cloudy conditions and evening and early morning hours when the Sun is not available), AC power from the grid is used as a source of power for the AC loads in the residence or building.

As explained above, by law, the inverter 110 must stop supplying AC power to the grid when a power outage occurs, in order to prevent high voltages from being back-fed into the grid. The inverter 110 can stop supplying AC power in various ways, for example, by disabling its internal choppers or by opening one or more internal safety switches connected in series with the grid connection power path. While isolating the inverter 110 from the grid during is a necessity during a power outage, in many circumstances it is desirable to continue supplying AC power to critical loads in the residence or building during the power outage. In the PV power generator 600 depicted in FIG. 6, the inverter 110 has a secondary AC output for this purpose. When a power outage occurs, the inverter 110 isolates itself from the grid. Additionally, rather than shutting down, the inverter 110 continues converting DC power supplied by the PV-generating portion of the system 600 and the battery bank 604 to AC power for the critical loads in the residence or building. Rather than directing the AC power to the main service panel 608, however, the AC power is produced at the secondary AC output of the inverter 110 and directed to a critical load sub-panel 616. The critical load sub-panel 616 then distributes the AC power to the critical loads in the residence or building. It should be mentioned that some inverters do not have a secondary AC output. In those circumstances a second inverter could be included in the system 600, to convert DC power from the PV-generating portion of the system 600 and the battery bank 604 into AC power and distribute the AC power to the critical load sub-panel 616 during the power outage. The optional AC generator 606 can also be configured to supply AC power to the critical load sub-panel 616 during the power outage. The AC power from the AC generator 606 can be supplied to the critical load sub-panel 616 via the inverter 110, if the inverter 110 has that capability. Alternatively, the AC generator 606 can be coupled directly to the critical load sub-panel 616.

When a fire hazard becomes present, the PV safety shutdown method of the present invention in the PV power generator 600 is performed similar to as described above in reference to FIG. 5. If a local fire detection/protection system 622 is available, an electrical signal from the system 622 can be used to automatically open the grid-disconnect switch or relay 214, and thereby automatically activate the PV safety shutdown process. The PV safety shutdown method can also be manually activated by opening the main circuit breaker in the main service panel 608, or by manually closing a separate, manually-operated grid-disconnect switch 218. While opening the main circuit breaker to initiate the PV safety shutdown process obviates the need for the manually-operated grid-disconnect switch 218, the separate, manually-operated grid-disconnect switch 218 may still be required by local codes or regulations, as previously mentioned. When the manually-operated grid-disconnect switch 218 is included, it is preferably included in a Fire Department lock-box available to firefighters and accompanied by a fire sign that can be readily seen by firefighters, similar to as described above. Switches 626 and 628, which are used to electrically isolate the battery bank 604 from the DC input of the inverter 110 and the AC generator 606 from the AC input of the inverter 110 can also be included in the same Fire Department lock-box. Alternatively, the manually-operated grid-disconnect switch 218 and switches 626 and 628 can all be wired together and to a single main switch located in the lock-box, so that when a fire hazard is present, a firefighter need only manually open that single main switch to activate the PV safety shutdown method and, at the same time, electrically isolate the battery bank 604 and AC generator 606 from the inverter 110.

During the presence of a fire hazard it is desirable to prevent any source of AC power from being delivered to all AC load in the residence or building—including all critical loads. The fire protection/detection system 622 in FIG. 6 prevents power delivery to the critical load sub-panel 616 by either causing the inverter 110 to shut down or by sending a fire detection signal provided by the first protections/protection system 622 to an AC switch or relay 624 that opens in response to the fire detection signal. If available, that same fire detection signal can be beneficially used to automatically activate (i.e., open) the grid-disconnect switch or relay 214, in order to initiate the PV safety shutdown method of the present invention. It should be noted that even if a central fire detection/protection system 622 is unavailable, the PV safety shutdown process can still be activated by opening the main breaker switch in the main service panel 608 or by opening the manually-operated grid-disconnect switch 218, similar to described above.

Figure 7:
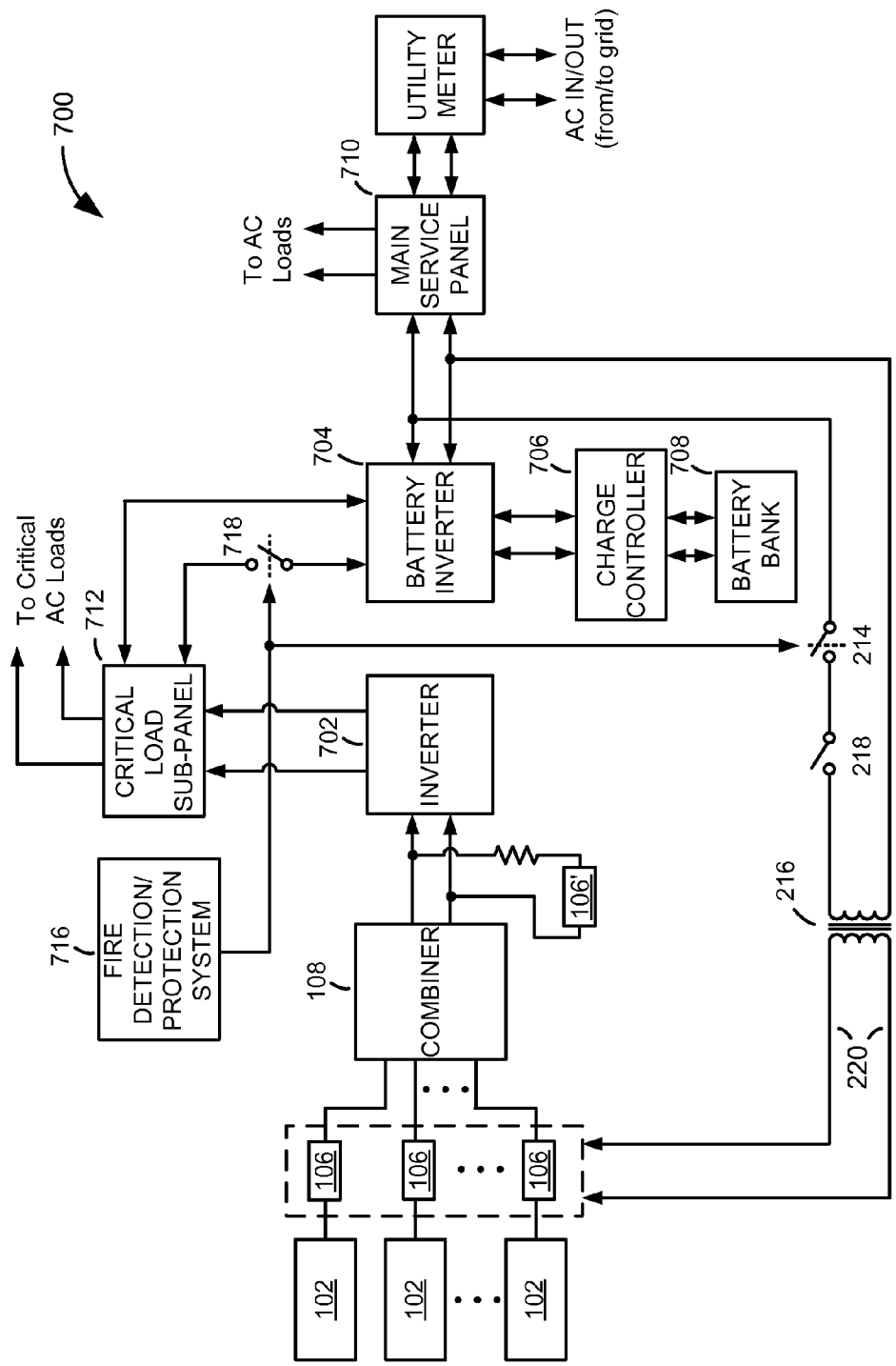
FIG. 7 is a drawing illustrating how the safety shutdown systems and methods of the present invention can be employed in a different type of grid-tied PV power generator that has local battery storage.

FIG. 7 is a drawing illustrating how the safety shutdown systems and methods of the present invention can be employed in an alternative type of grid-tied PV power generator 700 that has local battery storage. Similar to the grid-tied PV power generator 600 in FIG. 6, the grid-tied PV power generator 700 in FIG. 7 serves as a solar-assisted uninterruptable power system, but rather than employing a single battery inverter 110, the grid-tied PV power generator 700 employs two inverters—a battery-less inverter 702 and a second battery-powered battery inverter 704. During normal operating conditions, the battery-less inverter 702 is configured to convert solar-produced DC power supplied at the output of the combiner 108 to solar-produced AC power. The solar-produced AC power is passed through the battery inverter 704 to a main service panel 710, which then distributes the AC power to AC loads in the residence or building. The solar-produced AC power is also used to maintain the charge of a battery bank 708, which is regulated by a charge controller 706. Any surplus solar-produced AC power is supplied to the grid. In some jurisdictions this surplus solar-produced power may be sold to the local electrical utility.

Upon the occurrence of a power outage, the battery inverter 704 isolates itself from the grid, in order to prevent high voltages from being back-fed into the grid. The battery inverter 704 then draws DC power from the battery bank 708, and converts the battery-produced DC power to battery-produced AC power. Finally, the battery-produced AC power is directed to a critical load sub-panel 712, which distributes the AC backup power to critical loads in the residence or building.

When a fire hazard becomes present, the PV safety shutdown method of the present invention in the PV power generator 700 is performed. If a local fire detection/protection system 716 is available, a fire detection signal provided by the fire detection/protection system 716 can be used to automatically open the grid-disconnect switch or relay 214, and thereby automatically activate the PV safety shutdown process. The PV safety shutdown method can be alternatively activated by manually opening the main circuit breaker in the main service panel 710, or by manually opening the separate, manually-operated grid-disconnect switch 218. As discussed above, while opening the main circuit breaker to initiate the PV safety shutdown process obviates the need for the manually-operated grid-disconnect switch 218, the separate, manually-operated grid-disconnect switch 218 may be required by local codes or regulations. When incorporated in the installation, the manually-operated grid-disconnect switch 218 is preferably included in a Fire Department lock-box for quick access by firefighters, and the lock-box is preferably accompanied by a fire sign that allow firefighters to easily see and locate the lock-box.

When a fire hazard becomes present, the PV safety shutdown method of the present invention in the PV power generator 700 is initiated and performed similar to described above, by triggering open the automatically-triggered grid-disconnect switch or relay 214, by manually opening the main circuit breaker in the main service panel, or by manually opening the manually-operated grid-disconnect switch 218. Performing the PV shutdown method deprives the battery-less inverter 702 from DC power and thereby beneficially prevents the battery-less inverter 702 from generating and supplying AC power to the critical load sub-panel 712 during a fire hazard. It is also desirable to prevent the battery inverter 704 from supplying AC power to the critical load sub-panel 712 when a fire hazard is present. In PV power generators, like that depicted in FIG. 7, in which a local fire detection/protection system 716 is in place, the fire detection/protection system 716 will typically be configured to electrically isolate the battery inverter 704 from a critical load sub-panel 712 when a fire hazard is present. Isolating the battery inverter 704 prevents any AC backup power that may be generated from DC power supplied by the battery bank 708 (and any AC backup power that might possibly be supplied from any AC power generator that may be present in the system) from being directed to the critical load sub-panel 712. If the fire protection/detection system 716 is present, it is configured to electrically isolate the battery inverter 704 from the critical load sub-panel 712 during a fire hazard by either commanding the battery inverter 704 to shut down, or by directing a fire detection signal to an AC switch or relay 718 disposed in the AC path between the battery inverter 706 and the critical load sub-panel 712 to cause the AC switch or relay 718 to open. If available, that same fire detection signal can be beneficially used to automatically trigger the automatically-triggered grid-disconnect switch or relay 214, and thereby activate the PV safety shutdown process.

In some circumstances there may not be a fire detection/protection system 716 available to automatically trigger the grid-disconnect switch or relay 214, in order to activate the PV safety shutdown method. Nevertheless, similar to as explained above, the PV safety shutdown method can still be activated by either manually opening the main circuit breaker in the main service panel 710 or by manually opening the manually-operated grid-disconnect switch 218. Local codes or regulations may require the manually-operated grid-disconnect switch 218 to be provided, even though the PV safety shutdown method can be activated by opening the main circuit breaker in the main service panel 710, and even if there is some way to automatically trigger open the grid-disconnect switch or relay 214. If such a requirement exists, or if required or desired for any other reason, it is preferable to include the manually-operated grid-disconnect switch 218 in a Fire Department lock-box with a fire sign that is clearly visible to firefighters. When a fire hazard is present, firefighters can then unlock the lock-box with a special firefighter key to access the manually-operated grid-disconnect switch 218 and quickly activate the PV safety shutdown process. If desired or required, the AC switch/relay 718 used to isolate the battery inverter 704 from the critical load sub-panel 712 can also be included in the lock-box, as well as any other switches or relays that may be used to electrically isolate the battery bank 708 and any AC power generator(s) that may be present in the system 700. Alternatively, some or all of these various switches and/or relays can be wired to a single main switch in the lock-box, so that, when a fire hazard becomes present, a firefighter need only manipulate the single main switch to activate the PV safety shutdown process, prevent power delivery to the critical load sub-panel 712, and electrically isolate the battery bank 604 and any AC generator(s) that may be coupled to the system 700.

The examples provided in FIGS. 5-7 above demonstrate how the solar safety switches 106 can be deployed and operate in various grid-tied PV power generators 500, 600 and 700. The examples have been provided to demonstrate how the solar safety switches 106 of the present invention are employed in grid-tied PV power generators and how the PV safety shutdown method of the present invention is performed in such systems. It should be emphasized, however, that grid-tied PV power generators can be constructed in many different ways. Accordingly, whereas FIGS. 5-7 illustrate how the PV safety shutdown systems, methods, and apparatuses of the invention can be beneficially employed in a few different types of grid-tied PV power generators, those examples should not be viewed as limiting the applicability of the PV safety shutdown systems, methods, and apparatuses of the invention to any particular type of grid-tied PV power generator. In fact, the PV safety shutdown systems, methods, and apparatuses of the invention can be employed in any type of grid-tied PV power generator, to provide a safe, efficient, simple, and quick approach to preventing high voltages from developing at the DC outputs of the solar panel strings 102 during the presence of a fire hazard. Furthermore, the PV safety shutdown systems, methods, and apparatuses of the invention are not limited to use in grid-tied PV power generators. In other words, they can be employed in stand-alone PV power generators that have no connection to a utility grid. Stand-alone PV power generators are often used in remote locations, where access to an electrical utility grid is not possible or in circumstances where a residence or building owner prefers not to have their PV power generator connected to the grid. Although it is not possible to use the absence of grid power as a trigger to activate the PV safety shutdown method of the present invention, the PV safety shutdown method can nevertheless be easily performed in stand-alone PV power generators. For example, if a detection/protection system is available, a fire detection signal from the fire detection/protection system could be used to open an automatically-triggered switch or relay that is connected in series with primary or secondary windings of the control line transformer 216, similar to as described above. Alternatively or additionally, a manually-operated switch that is connected in series with the primary or secondary windings of the control line transformer 216 can be provided to provide firefighters the ability to manually activate the PV safety shutdown method. Similar to as explained above, the manually-operated switch would be preferably located in a lock-box with an accompanying fire sign that is clearly visible to firefighters. Upon a fire hazard becoming present, all a firefighter would need to do is to unlock the lock-box and manually open the manually-operated switch, in order to activate the PV safety shutdown method.

While various embodiments of the present invention have been presented, they have been presented by way of example and not limitation. It will be apparent to persons skilled in the relevant art that various changes in form and detail may be made to the exemplary embodiments without departing from the true spirit and scope of the invention. Accordingly, the scope of the invention should not be limited by the specifics of the exemplary embodiments of the invention but, instead, should be determined by the appended claims, including the full scope of equivalents to which such claims are entitled.

What is claimed is:

1. A safety shutdown apparatus for a photovoltaic power generator, comprising
    a first solid-state device configured to remain off when the photovoltaic power generator is operating under normal operating conditions and configured to be turned on and effectively short circuit a direct current (DC) output of a solar panel or group of solar panels of said photovoltaic power generator when a fire hazard is present in a vicinity of said photovoltaic power generator; and
    a close actuator having first and second power terminals electrically coupled to positive and negative terminals of the DC output of said solar panel or group of solar panels, a control input terminal, and a control output terminal coupled to a control input terminal of said first solid-state device, said close actuator configured to control whether said first solid-state device is turned on or is turned off.

2. The safety shutdown apparatus of claim 1, wherein said close actuator includes a second solid-state device having an output terminal that serves as the control output terminal of the close actuator.

3. The safety shutdown apparatus of claim 2, wherein said close actuator further comprises an inhibitor circuit configured to control said second solid-state device, and wherein said inhibitor circuit and said second solid-state device are configured to maintain said first solid-state device off when the photovoltaic power generator is operating under normal operating conditions.

4. The safety shutdown apparatus of claim 3, wherein said inhibitor circuit has an input terminal that serves as the control input terminal of said close actuator, and wherein said inhibitor circuit and said second solid-state device are configured to cause said first solid-state device to turn on in an absence of an inhibit signal being received at the input terminal of said inhibitor circuit.

5. The safety shutdown apparatus of claim 4, further comprising an open actuator that is configured to automatically turn said first solid-state device off after an event that caused said inhibitor circuit and said second solid-state device to turn said first solid-state device on has been remedied.

6. The safety shutdown apparatus of claim 4, wherein said first solid-state device comprises a thyristor.

7. The safety shutdown apparatus of claim 6, wherein said second solid-state device comprises a programmable unijunction transistor (PUT) having a gate, an anode, and a cathode that is coupled to a gate of said thyristor and which serves as the control output terminal of said close actuator.

8. The safety shutdown apparatus of claim 7, wherein said inhibitor circuit includes a capacitor that is coupled to the anode of said PUT, and wherein said inhibitor circuit is configured to prevent said capacitor from charging to a voltage higher than a turn on voltage of said PUT when the photovoltaic power generator is operating under normal operating conditions.

9. The safety shutdown apparatus of claim 8, wherein in an absence of an inhibit signal being received at the input terminal of said inhibitor circuit said capacitor is allowed to charge to a voltage higher than the turn on voltage of said PUT and said PUT is not inhibited from turning said first solid-state device on.

10. The safety shutdown apparatus of claim 4, further comprising a transformer having a primary winding and a secondary winding, said transformer configured to receive an alternating current (AC) control signal at its primary winding and produce said inhibit signal at its secondary winding.

11. The safety shutdown apparatus of claim 10, wherein said inhibitor circuit and said second solid-state device are configured to cause said first solid-state device to turn on in an absence of an AC control signal being received at the primary winding of said transformer.

12. The safety shutdown apparatus of claim 11, further comprising an open actuator configured to automatically turn said first solid-state device off after an event that caused said inhibitor circuit and said second solid-state device to turn said first solid-state device on has been remedied and an AC control signal is once again being received at the primary winding of said transformer.

13. A safety shutdown method for a photovoltaic power generator, comprising:
electrically configuring a first solid-state device between positive and negative terminals of a DC output of a solar panel or group of solar panels;
producing an inhibit signal;
inhibiting a second solid-state device from turning on said first solid-state device using said inhibit signal;
upon a fire hazard being detected in a vicinity of the photovoltaic power generator, preventing said inhibit signal from being produced; and
upon preventing said inhibit signal from being produced, allowing said second solid-state device to turn said first solid-state device on and effectively short circuit the DC output of said solar panel or group of solar panels.

14. The safety shutdown method of claim 13, wherein inhibiting said second solid-state device from turning on said first solid-state device using said inhibit signal comprises:
generating a fixed reference voltage,
applying said fixed reference voltage to a first input terminal of said second solid-state device,
generating a variable voltage using said inhibit signal,
applying said variable voltage to a second input terminal of said second solid-state device, and
preventing a difference between said variable voltage and said fixed reference voltage from exceeding a turn on voltage of said second solid-state device.

15. The safety shutdown method of claim 14, wherein said fixed reference voltage and said variable voltage are both generated using DC power supplied by said solar panel or said group of solar panels.

16. The safety shutdown method of claim 14, wherein preventing a difference between said variable voltage and said fixed reference voltage from exceeding a turn on voltage of said second solid-state device comprises using said inhibit signal to limit a voltage to which a capacitor coupled to the second input terminal of solid-state device can charge.

17. The safety shutdown method of claim 16, wherein allowing said second solid-state device to turn said first solid-state device on and effectively short circuit the DC output of said solar panel or group of solar panels comprises not limiting a voltage to which said capacitor is able to charge and allowing the difference between said variable voltage and said fixed reference voltage to exceed the turn on voltage of said second solid-state device.

18. The safety shutdown method of claim 14, wherein said second solid-state device comprises a programmable unijunction transistor (PUT) having an anode that corresponds to the first input terminal of said second solid-state device, a gate that corresponds to the second input terminal of said second solid-state device, and a cathode that is coupled to a control input of said first solid-state device.

19. The safety shutdown method of claim 18, wherein said first solid-state device comprises a thyristor having a gate that is coupled to the cathode of said PUT.

20. The safety shutdown method of claim 13, wherein said inhibit signal is produced based on alternating current (AC) supplied by an electrical power distribution grid.

21. The safety shutdown method of claim 20, wherein preventing said inhibit signal from being produced comprises disconnecting the photovoltaic power generator from said electrical power distribution grid.

22. The safety shutdown method of claim 21, wherein disconnecting the photovoltaic power generator from said electrical power distribution grid comprises automatically opening a grid-disconnect switch or relay in response to an electrical signal that is indicative of a presence or detection of a fire.

23. A photovoltaic power generator with safety shutdown system, comprising:
- a plurality of solar panel strings, each solar panel string including one or more solar panels;
- a combiner; and
- a plurality of solar safety switches coupled between a plurality of direct current (DC) outputs of said plurality of solar panel strings and a plurality of DC inputs of said combiner, each solar safety switch of said plurality of solar safety switches associated with one of the solar panel strings of said plurality of solar panel strings and each solar safety switch including a first solid-state device and an associated close actuator that is electrically coupled across the DC output of its associated solar panel string,
- wherein the close actuators of said plurality of solar safety switches are configured to maintain their respective first solid-state devices off during normal operating conditions and to cause their respective first solid-state devices to turn on and effectively short circuit the DC outputs of their associated solar panel strings when a fire hazard has been detected in a vicinity of said photovoltaic power generator.

24. The system of claim 23, wherein the close actuator of each solar safety switch includes a second solid-state device configured to control whether the associated first solid-state device is turned on or is turned off.

25. The system of claim 24, wherein the close actuator of each solar safety switch further includes an inhibitor circuit configured to maintain the second solid-state device of each solar safety switch off during normal operating conditions and cause the second solid-state device of each solar safety switch to turn its associated first solid-state switch on when a fire hazard has been detected in a vicinity of said photovoltaic power generator.

26. The system of claim 25, wherein the first solid-state device of each solar safety switch comprises a thyristor.

27. The system of claim 26, wherein the second solid-state device of each solar safety switch comprises a programmable unijunction transistor configured to control a gate of its associated thyristor.

28. The system of claim 23, wherein each solar safety switch further comprises an open actuator configured to automatically turn on its associated first solid-state device after an event that caused the close actuators of said plurality of solar safety switches to turn on their respective first solid-state devices has been remedied.

* * * * *